US011593813B2

(12) United States Patent
Manoharan et al.

(10) Patent No.: US 11,593,813 B2
(45) Date of Patent: Feb. 28, 2023

(54) RULE ENGINE OPTIMIZATION VIA PARALLEL EXECUTION

(71) Applicant: PAYPAL, INC., San Jose, CA (US)

(72) Inventors: Srinivasan Manoharan, San Jose, CA (US); Junhua Zhao, Sunnyvale, CA (US); Yuehao Wu, Cupertino, CA (US); Xiaohan Yun, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 200 days.

(21) Appl. No.: 16/731,708

(22) Filed: Dec. 31, 2019

(65) Prior Publication Data

US 2021/0201317 A1 Jul. 1, 2021

(51) Int. Cl.
*G06Q 20/40* (2012.01)
*G06F 9/46* (2006.01)

(52) U.S. Cl.
CPC .......... *G06Q 20/405* (2013.01); *G06F 9/463* (2013.01); *G06Q 20/4016* (2013.01)

(58) Field of Classification Search
CPC ......... G06Q 20/4016; G06Q 10/06395; G06Q 20/405; G06Q 16/9027; G06Q 16/2228
See application file for complete search history.

(56) References Cited

U.S. PATENT DOCUMENTS

| | | | | |
|---|---|---|---|---|
| 7,788,195 | B1 * | 8/2010 | Subramanian | G06N 20/00 |
| | | | | 706/20 |
| 8,571,982 | B2 * | 10/2013 | Choudhuri | G06Q 40/02 |
| | | | | 705/35 |
| 11,087,409 | B1 * | 8/2021 | Bobley | G06V 30/224 |
| 2011/0196791 | A1 * | 8/2011 | Dominguez | G06Q 40/00 |
| | | | | 705/44 |
| 2012/0317013 | A1 * | 12/2012 | Luk | G06Q 40/025 |
| | | | | 705/38 |
| 2013/0346294 | A1 * | 12/2013 | Faith | G06Q 20/4016 |
| | | | | 705/39 |
| 2017/0212731 | A1 * | 7/2017 | Beck | G06F 9/44536 |

* cited by examiner

*Primary Examiner* — Bruce I Ebersman
*Assistant Examiner* — Matthew Cobb
(74) *Attorney, Agent, or Firm* — Haynes and Boone, LLP

(57) ABSTRACT

A first graph that includes a plurality of containers is accessed. The containers each contain one or more rules that each have corresponding computer code. The containers are configured for sequential execution by a rule engine. The computer code corresponding to the one or more rules in each of the containers is electronically scanned. Based on the electronic scan, an interdependency among the rules is determined. Based on the determined interdependency, a second graph is generated. The second graph includes all of the rules of the containers, but not the containers themselves. At least some of the rules are configured for parallel execution by the rule engine.

20 Claims, 8 Drawing Sheets

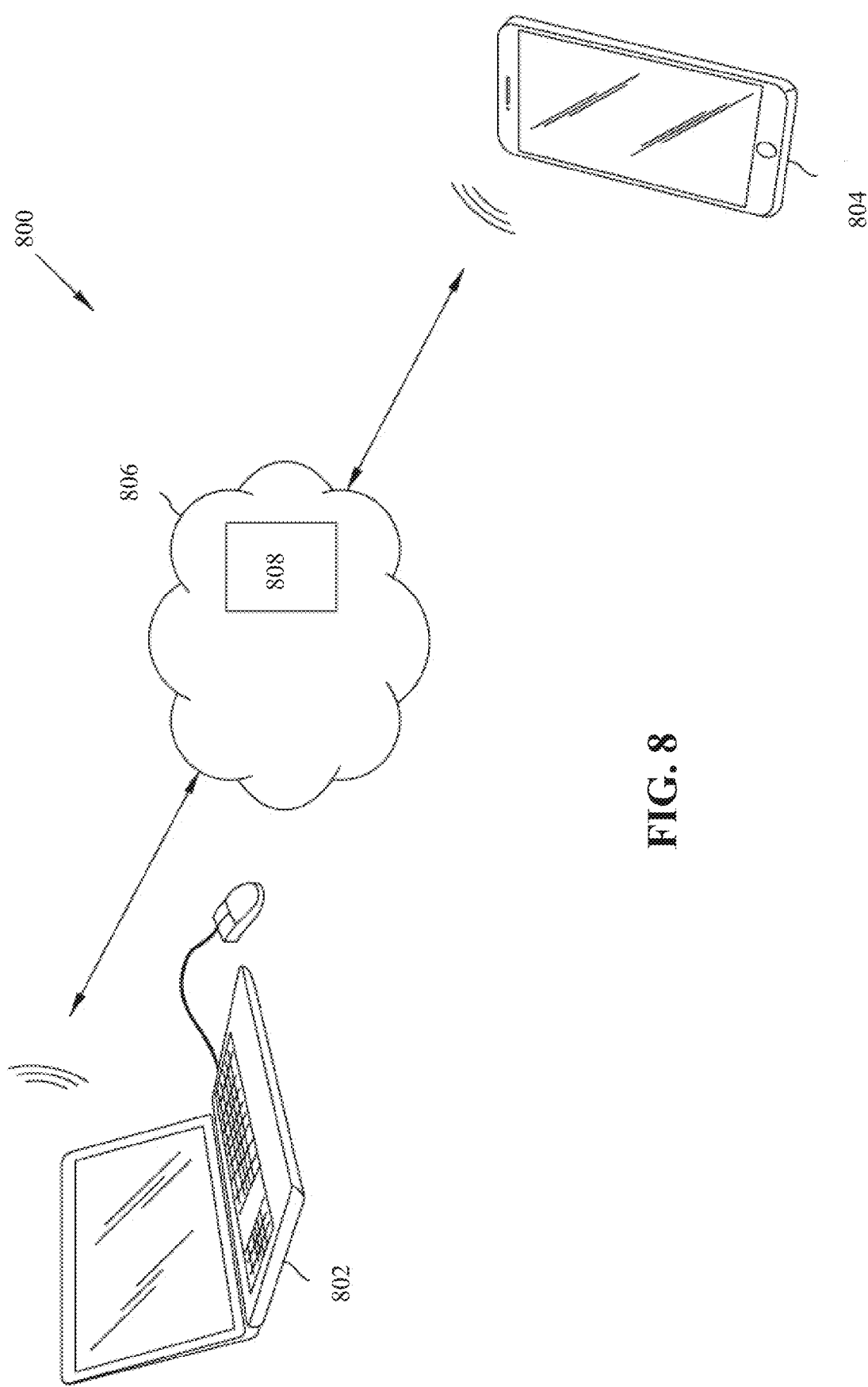

RULE ENGINE OPTIMIZATION VIA PARALLEL EXECUTION

BACKGROUND

Field of the Invention

The present invention generally relates to rule engines, and more particularly, to improving the speed and/or efficiency of rule engine execution.

Related Art

Rapid advances have been made in the past several decades in the fields of computer technology and telecommunications. As a result, these advances allow more and better automated decisions to be made via computer systems. For example, a rule engine (e.g., a software system that executes one or more predefined rules in a runtime production environment) may be utilized to make automated decisions in various contexts, including but not limited to fraud prevention in online transactions or user personalization services. However, conventional rule engines are limited to sequential execution, which leads to inefficiencies with respect to computer processing and/or use of network resources. What is needed is a more optimized rule engine that allows for parallel execution under appropriate circumstances.

BRIEF DESCRIPTION OF THE FIGURES

FIG. 8 is a simplified example of a cloud-based computing architecture according to various aspects of the present disclosure.

Figure 1:
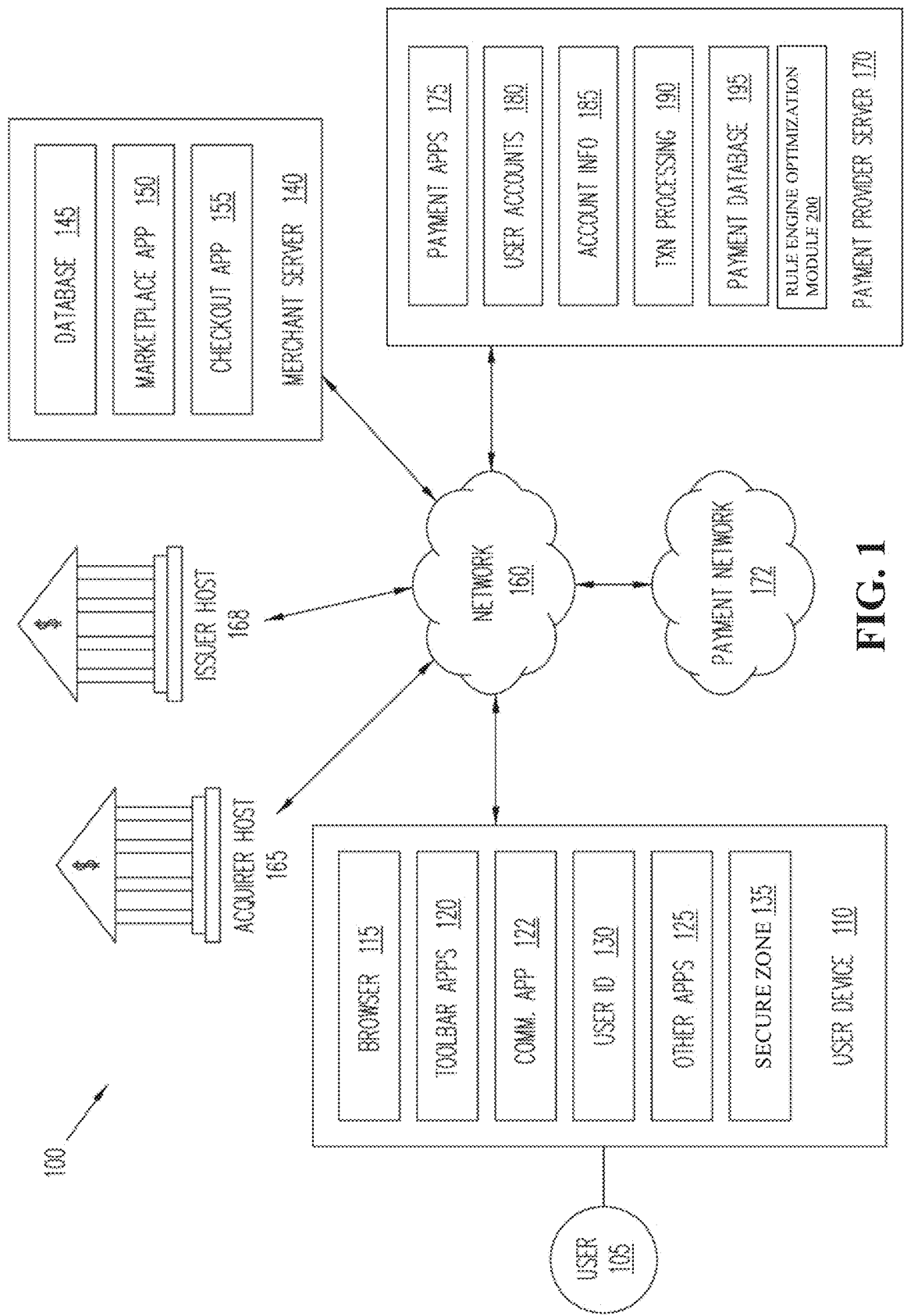
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to systems and methods of optimizing rule engines. In more detail, rule engines may be executed according to a rule flow graph. The rule flow graph is comprised of a plurality of folders (also referred to as packages) that each contain one or more rules. The rules may be programmed in a suitable computer programming language and may include "if-then-else" types of statements that specify conditions to be met and actions to be taken in response to the meeting of the conditions (or not meeting the conditions). As a simple and non-limiting example, a rule may specify (in computer programming code) that if a user has failed to log into an account after an X number of attempts, additional data should be loaded to examine the user and/or to determine whether fraud is involved in the user's login attempts.

According to the rule flow graph, the packages or rule-containing-folders are executed sequentially by the rule engine. For example, if the rule flow graph places a first folder ahead of a second folder, then all of the rules of the first folder must be executed by the rule engine before the rules in the second folder can be executed. The sequential execution of the folders and their rules within may be inefficient and/or slow. For example, one or more rules in the second folder may not depend on the rules in the first folder, and therefore the execution of these rules in the second folder is unnecessarily delayed since the rules in the second folder cannot be executed until all the rules in the first folder have been executed.

According to various aspects of the present disclosure, a new graph is generated based on the rule flow graph. The new graph allows for parallel execution of the rules by the same rule engine that is configured to execute the rule flow graph, without distorting the results of the execution. For example, the computer programming code of the rules of a rule flow graph is examined electronically. The electronic examination reveals the interdependency among the rules. For rules that are not dependent on other rules, they can be executed in parallel in separate threads or flows. In other words, the new graph is not comprised of the folders but is actually comprised of all the rules in the rule flow graph. In some embodiments, the new graph corresponds to a plurality of threads. Each thread contains one or more rules that are dependent on the rest of the rules within that thread, but the rules in any given thread do not depend on the rules in other threads, which allows for the parallel execution of the threads. As a result, the new graph can be executed faster and more efficiently, while achieving the same results (e.g., in terms of accurate decision making) as the previous rule flow graph.

The various aspects of the present disclosure are discussed in more detail with reference to FIGS. 1-8.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PAYPAL!, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an IPAD™ from APPLE™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the APP-STORE™ of APPLE! or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a rule engine optimization module 200 may also be implemented on the payment provider server 170. The rule engine optimization module 200 may include one or more software applications or software programs that can be automatically executed (e.g., without needing explicit instructions from a human user) to perform certain operations. For example, the rule engine optimization module 200 may use an existing rule flow graph for a rule engine to automatically generate a new graph to be executed by the rule engine. As will be discussed in more detail below with reference to FIG. 2, the rule flow graph may be designed or constructed by personnel associated with an entity, for example by business analysts of the payment service provider, where the business analysts may be an employee of the payment provider or may be an outside consultant.

In some embodiments, the rule flow graph may correspond to contexts such as fraud prevention or user personalization. For example, the rule flow graph may be configured to make intelligent decisions with respect to whether a user's login is valid, where a user attempts to logon to the payment provider server 170 to conduct one or more transactions, for example with the merchant server 140. The rule flow graph may be arranged as a plurality of folders (or packages) that are sequentially executed, where each of the folders contain one or more rules in the form of computer code. Each of rules may specify a condition that can be met, and what action(s) to perform when such a condition is met or is not met. For example, a rule may specify that when the user's login attempt has failed an X number of times (e.g., the condition to be met), additional data should be loaded (e.g., the action to be performed in response to the condition being met) to further examine the validity of the user attempting the login. The sequential execution of the folders may waste computer and/or network resources, since a folder that is located further down in the chain could have otherwise been executed simultaneously with a folder that is ahead of it in the chain but is not due to the sequential nature of the execution.

Here, the rule engine optimization module 200 generates a new graph for the rule engine to run, where the new graph is not based on folders but based on rules themselves. The interdependency among the rules has also been determined and is used to construct the new graph, such that the rules that do not depend from one another may be executed in parallel with one another (e.g., simultaneously). In other words, multiple threads or flows may be utilized to execute the new graph, and as such the execution of the new graph may achieve the same results as the old rule flow graph but at a much faster speed, because the execution of the new graph optimizes computer resources by not having flows wait on execution that do not first require results of an earlier flow. An example of such a new graph will be discussed in more detail below with reference to FIG. 3.

It is noted that although the rule engine optimization module 200 is illustrated as being separate from the transaction processing application 190 in the embodiment shown in FIG. 1, the transaction processing application 190 may implement some, or all, of the functionalities of the rule engine optimization module 200 in other embodiments. In other words, the rule engine optimization module 200 may be integrated within the transaction processing application 190 in some embodiments. In addition, it is understood that the rule engine optimization module 200 (or another similar module or computer program) may be implemented on the merchant server 140, or even on a portable electronic device similar to the user device 110 as well.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
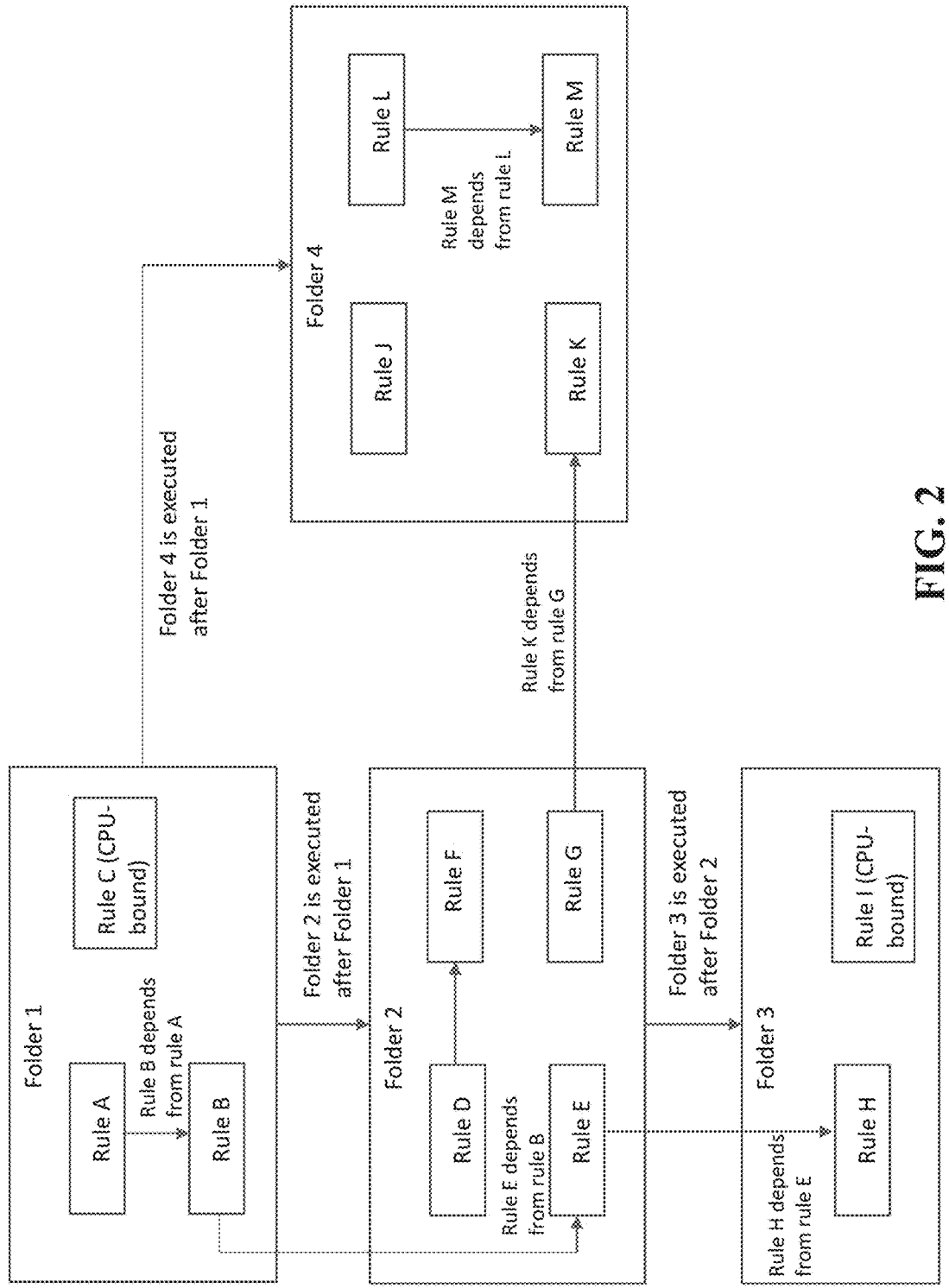
FIGS. 2-3 illustrate example graphs according to various aspects of the present disclosure.

FIG. 2 illustrates a simplified example rule flow graph 300 that is executable by a rule engine. The rule flow graph 300 may be used by an entity (e.g., a payment provider) to make a series of intelligent decisions depending on the context or environment. As one example, the rule flow graph 300 may be used to evaluate the likelihood of fraud associated with a transaction (e.g., a carding attack, an account takeover, etc.). As another example, the rule flow graph 300 may be used to provide personalized services or content to a user (e.g., ranking or recommending products or services for the user, customizing the display of a web page for the user, etc.).

In order to make these intelligent decisions, the rule flow graph 300 includes a plurality of folders (also referred to as packages) that may correspond to the stages of a decision-making process. Each folder may include one or more rules that are in the form of computer code, for example including "if-then-else" type of computer programming statements. These rules each specify a condition to be met, and what operations to perform when the condition is met (or is not met). As simple non-limiting examples, the rule flow graph 300 includes folders 1-4. Folder 1 may contain rule A, rule B, and rule C. Folder 2 may contain rule D, rule E, rule F, and rule G. Folder 3 may contain rule H and rule I. Folder 4 may contain rule J, rule K, rule L, and rule M.

Some of the rules may depend from other rules. As an example, rule B depends from rule A in folder 1. In other words, before rule B can be executed, rule A has to finish its execution. As a non-limiting example, rule A may specify a condition that is: has the user login attempt exceed X number of times? Rule A may also specify an action or operation to be performed when the specified condition (e.g., the user login attempt has exceeded X number of times) is met: load more data pertaining to the user, such as the IP address of the device used by the user to log in. Rule B may specify a condition that is: does the user device's IP address match one or more IP addresses that are known to be associated with fraudulent entities? Rule B may also specify an action to be performed when the specified condition (e.g., the user device's IP address does match an IP address that is known to be associated with a fraudulent entity) is met: elevate a security risk associated with the user and/or perform one or more fraud mitigation actions.

It can be seen that for rule B to be executed, it needs rule A to be executed first, since rule B's condition depends on rule A's action. It is understood that rule A and rule B are merely non-limiting examples used to illustrate one type of interdependency between the various rules herein. Other rules may have different types of interdependencies. For example, one rule's condition may depend from another rule's condition, or one rule's action may depend from another rule's action, or one rule's action may depend from another rule's condition. In any case, the rest of the interdependency between the rules of the folders 1-4 is as follows: rule E depends from rule B, rule F depends from rule D, rule H depends from rule E, rule K depends from rule G, and rule M depends from rule L.

Still referring to FIG. 2, some of the rules may not depend on other rules. For example, rule C, rule G, rule I, and rule J do not depend from any other rules. As such, rule C, rule G, rule I, and rule J could have each been executed in parallel with the other rules that depend from other rules (e.g., rules A, B, E) but are not herein due to the sequential nature of the rule flow graph 300. This leads to inefficiencies of execution and may result in a slower total run time and more frustrating user experience. In more detail, some of the rules may need to access data (e.g., from an electronic database) in order to finish their execution (e.g., to make additional evaluations). In that regard, a pre-fetch process may be used to load a limited amount of data (e.g., from the database) before the execution of the rule flow graph 300. The pre-fetch process does not load all of the data that could be potentially required by all of the rules because:

1. it may not be feasible to do so due to the large amount of data that would need to be loaded; and/or
2. it may be inefficient to do so, because much of the data will be unused, since some of the data is accessed only when certain conditions (specified by the rules) are met. Thus, when the conditions are not met, the data need not be loaded at all.

Therefore, using pre-fetch to load all of the data leads to not only a waste of resources but also a slower overall execution. As such, the pre-fetch is used to load only a small amount of data that is necessary to begin the execution of the rule flow graph 300, and each rule may load additional data when needed. This is referred to as a lazy-load process. However, due to the sequential nature of the execution of the rule flow graph 300, a rule that is further down in the chain (but does not have interdependencies with rules up in the chain) would still need to wait for the completion of all of the rules ahead of itself in the chain, before it can begin loading the data that it needs. For example, rule D in folder 2 does not depend from any of the rules in folder 1. However, since the rule flow graph 300 dictates that folder 2 is executed after folder 1, rule D cannot begin loading its data until rules A, B, and C in folder 1 have finished their execution, even though it would have been time-saving and more efficient for rule D to begin loading data in parallel with the rule A.

According to various aspects of the present disclosure, the rule engine optimization module 200 discussed above automatically transforms the rule flow graph 300 into a new graph that allows for parallel execution of the rules that do not depend from other rules, which increases the efficiency and speed of the execution of the new graph by the rule engine while achieving the same accurate results in terms of decision-making. A simple example of such a graph is illustrated in FIG. 3 as a graph 400.

Figure 3:
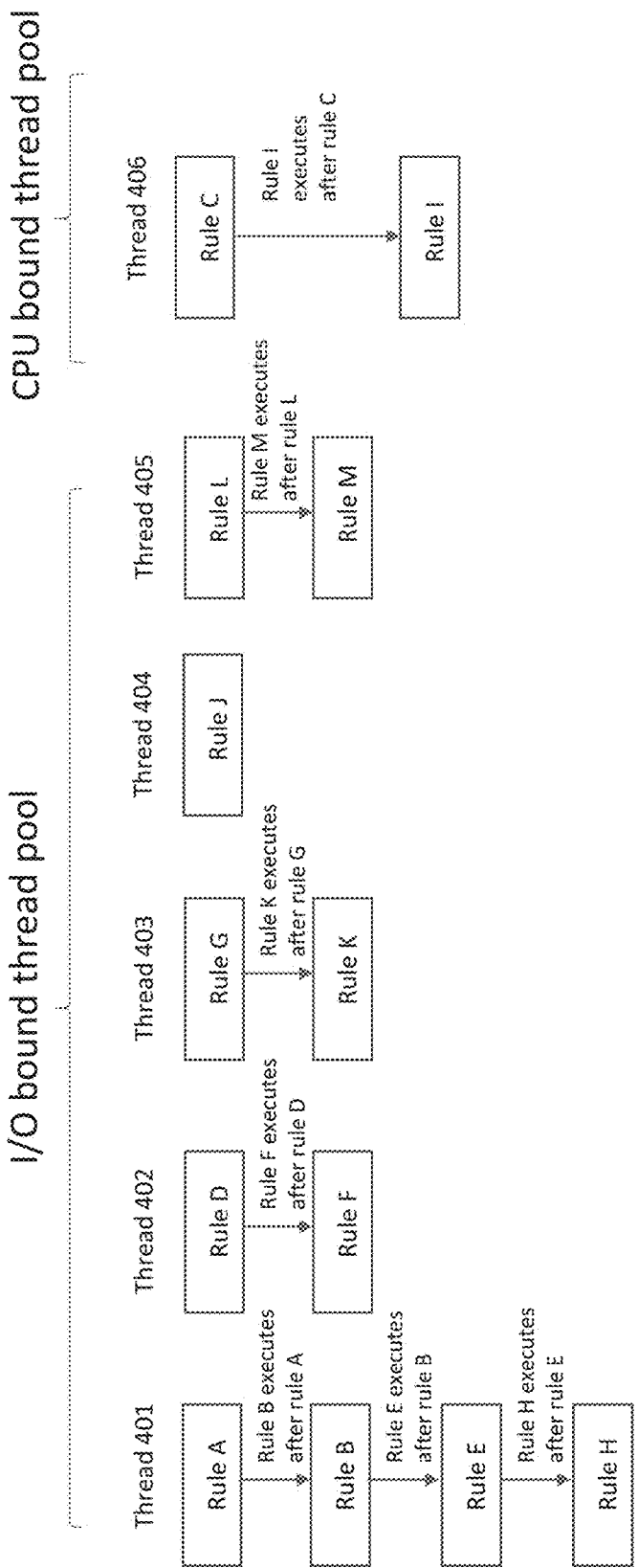

Referring now to FIG. 3, the graph 400 may be generated by the rule engine optimization module 200 in response to a received request, such as a request to process a transaction. The graph 400 is generated based on the rule flow graph 300 of FIG. 2. However, unlike the rule flow graph 300, the graph 400 is devoid of the rule-containing folders of FIG. 2 and executes the rules themselves directly. In that regard, the graph 400 includes the same rules that were in the rule flow graph 300, which in this simple example includes rules A-M. The graph 400 uses multiple threads to execute different subsets of these rules A-M in parallel. In that regard, each thread refers to a thread of execution in computer science, where multiple threads may be associated with a process and share resources with one another. Multi-threading is a way for a computer program to divide or split itself into multiple tasks that are running in parallel with one another substantially simultaneously.

In the example of FIG. 3, since rule H depends from rule E, which depends from rule B, which depends from rule A, the graph 400 executes the rules A, B, E, and H using thread 401. The rules A, B, E, and H may be executed sequentially.

Since rule F depends from rule D, the graph 400 executes the rules D and F sequentially using thread 402. Similarly, the graph 400 executes the rules G and K using thread 403, executes the rule J using thread 404, and executes the rules L and M using thread 405.

It can be seen that at least some of the rules within the same thread are rules from different folders of the rule flow graph 300. For example, rules A, B, and H are from folders 1, 2, and 3 of the rule flow graph 300, respectively, and yet they are grouped into the same thread 401 in the graph 400, because they depend on one another. On the other hand, at least some of the different threads of the graph 400 may contain rules from the same folder of the rule flow graph 300. For example, rules A and C in the graph 400 belong to threads 401 and 406, respectively, and yet they are both located in folder 1 of the rule flow graph 300. This is because rules A and C do not depend on each other and therefore may be executed in parallel with each other. Again, the graph 400 is free of the folders, and the rules in the graph 400 are arranged according to their interdependencies with one another, rather than their previous association with the folders in the rule flow graph 300.

The threads 401, 402, 403, 404, and 405 are executed in parallel with one another (e.g., substantially simultaneously with one another). As such, the rules in their respective threads 401-405 may load data (when needed) without having to wait for the completion of the execution of the rules in other threads. For example, rule D may begin loading data (if needed) without having to wait for the execution of the rules A, B, E, and/or H to be completed first, because rule D is independent of the other rules in other threads 401, 403, 404, and 405. In this manner, the execution of the graph 400 is substantially more efficient and faster than execution of the rule flow graph 300, which improves the functionality of a computer (e.g., the computer on which the rule engine is run).

According to an embodiment of the present disclosure, the rules may also be grouped or executed differently based on their type. For example, some of the rules are I/O (input-output) bound rules, and other rules are CPU bound rules. The I/O bound rules may include rules that need to load additional data (e.g., from a database via an electronic network component such as transceivers or network interface cards) outside of the graph 400 as a part of their execution. In contrast, the CPU bound rules do not need to load additional data from the database. Instead, the CPU bound rules may perform tasks such as arithmetic calculations, without needing to load data from external sources. Due to these differences, the I/O bound rules may derive substantial benefits from the parallel execution described above, while the CPU bound rules may not derive much benefit from the parallel execution. This is because the parallel execution significantly reduces the data loading time, which would have consumed a substantial portion of the total execution time of the I/O bound rules. As such, parallel execution of the I/O bound rules reduces the total amount of the data loading time, which achieves a faster overall execution time.

On the other hand, since the CPU bound rules do not need to load data externally, they can execute the tasks very quickly anyway (e.g., on the order of nanoseconds). Parallel execution of the CPU bound rules therefore may only marginally reduce the overall execution time of the CPU bound rules. However, parallel execution may be associated with an overhead since it requires multiple threads to be run (and may require data to be shared between the multiple threads). In the case of I/O bound rules, the benefit achieved greatly outweighs the overhead attributed to parallel execution, but in the case of CPU bound rules, the benefit achieved may not outweigh such an overhead. Therefore, the graph 400 may still execute the CPU bound rules sequentially in a single thread (e.g., thread 406). In other words, the graph 400 is generated such that one pool of threads (e.g., threads 401-405) are created to run the I/O bound rules in parallel, while another thread (e.g., thread 406) is created to run the CPU bound rules sequentially. However, such a configuration is not intended to be limiting. It is contemplated that the CPU bound rules may also be executed in parallel (e.g., with multiple threads) in alternative embodiments. In addition, though the CPU bound rules are sequentially executed within the thread 406, they are still executed in parallel with the I/O bound rules (e.g., in parallel with the threads 401-405).

As a part of the generation of the graph 400, the rule engine optimization module 200 determines the interdependency among the rules such as the rules A-M. In some embodiments, the rule engine optimization module 200 identifies the common variables that appear in multiple rules. This may be done at least in part using an abstract syntax tree. In general, an abstract syntax tree exists for any given programming language (e.g., C, C++, Java, Python, PERL, etc.). The abstract syntax tree is a tree representation of the abstract syntactic structure of the computer programming code for the given programming language.

Figure 4:
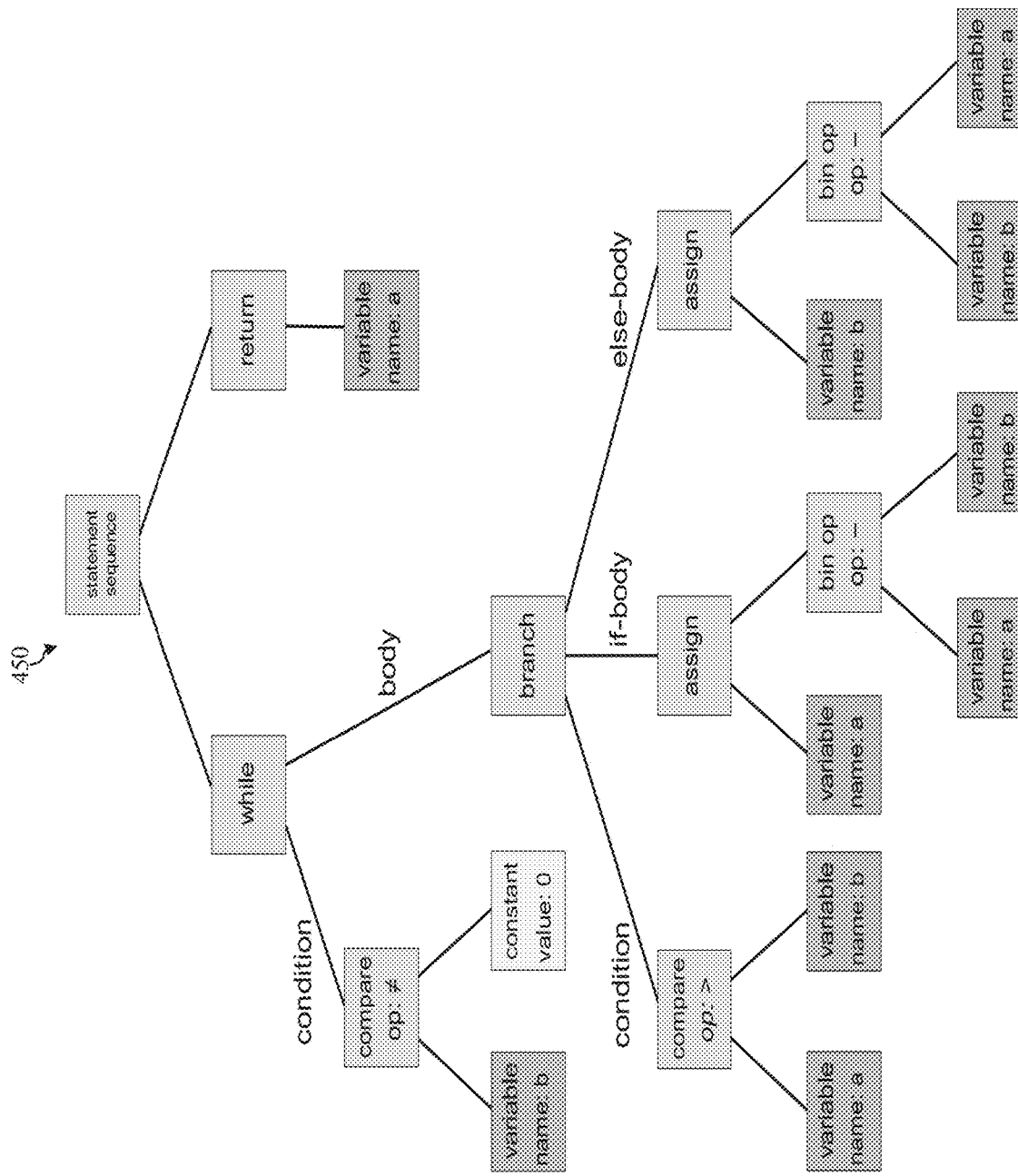
FIG. 4 illustrates an abstract syntax tree according to various aspects of the present disclosure.

A simple example of such an abstract syntax tree 450 is illustrated in FIG. 4, which illustrates the following computer code:

```
while b ≠ 0
    if a > b
        a := a − b
    else
        b := b − a
return a
```

As shown in FIG. 4, the abstract syntax tree 450 may include commands such as "while", "if", "else", etc. The abstract syntax tree 450 may also include operators such as "≠", ">", "−", etc. Each operator may be branched to the left and to the right. The left branch may correspond to a variable name (e.g., "a", "b"), whereas the right branch may correspond to a value such as a numerical constant (e.g., "0") or a text string. Thus, based on the abstract syntax tree 450, the rule engine optimization module 200 will know which part of the computer programming code is a command, which part of the computer programming code is a condition statement, which part of the computer programming code is an operator, which part of the computer programming code is a variable, and/or which part of the computer programming code is a value to be assigned to a variable, etc. As such, the rule engine optimization module 200 may be able to electronically scan the source code of the folders (e.g., the folders 1-4 of FIG. 2) and/or the rules (e.g., the rules A-M) inside the folders of a rule flow graph in order to identify the common variables among them.

For example, the following computer code may correspond to one of the rules A-M discussed above:

```
if
    _Transaction transaction is GCE flow
    and_Transaction transaction GCE flowType equals 1
    and_VAR value of variable ("GCE_FASTLANE_SEG-
        MENT") equals "OTHER"
``` and Edge container VID_CONTAINER with key integer to string (Session session VID) for decimal variable "vid_cnt_dk_10" is more than 1
then
    Result evaluate Account;

Based on the abstract syntax tree, the rule engine optimization module 200 may parse the above code and determine that, among other things, "if" and "then" are condition statements, and that "GCE_FASTLANE_SEGMENT" is a name of a variable (among other variables in this rule). The rule engine optimization module 200 may electronically scan other folders and/or rules to detect the presence of the variable GCE_FASTLANE_SEGMENT in these other rules, for example. Note that the electronic scanning performed by the rule engine optimization module 200 may be done "online" or "offline". For example, the rule engine optimization module 200 may perform the electronic scanning "online" at (or after) the start of the rule engine, or it may perform the electronic scanning "offline" before the rule engine is started.

In some embodiments, if the result of the electronic scanning indicates that two rules both contain a common variable, that may reflect an interdependency between them, and therefore these rules may need to be executed sequentially. On the other hand, if the result of the electronic scanning indicates that two rules do not share any common variables, then that may reflect an independence between these two rules, and that these two rules may be executed in parallel with one another (e.g., simultaneously loading their respective data from a database). In this manner, the rule engine optimization module 200 may transform the rule flow graph 300 into the graph 400 as discussed above.

Figure 5:
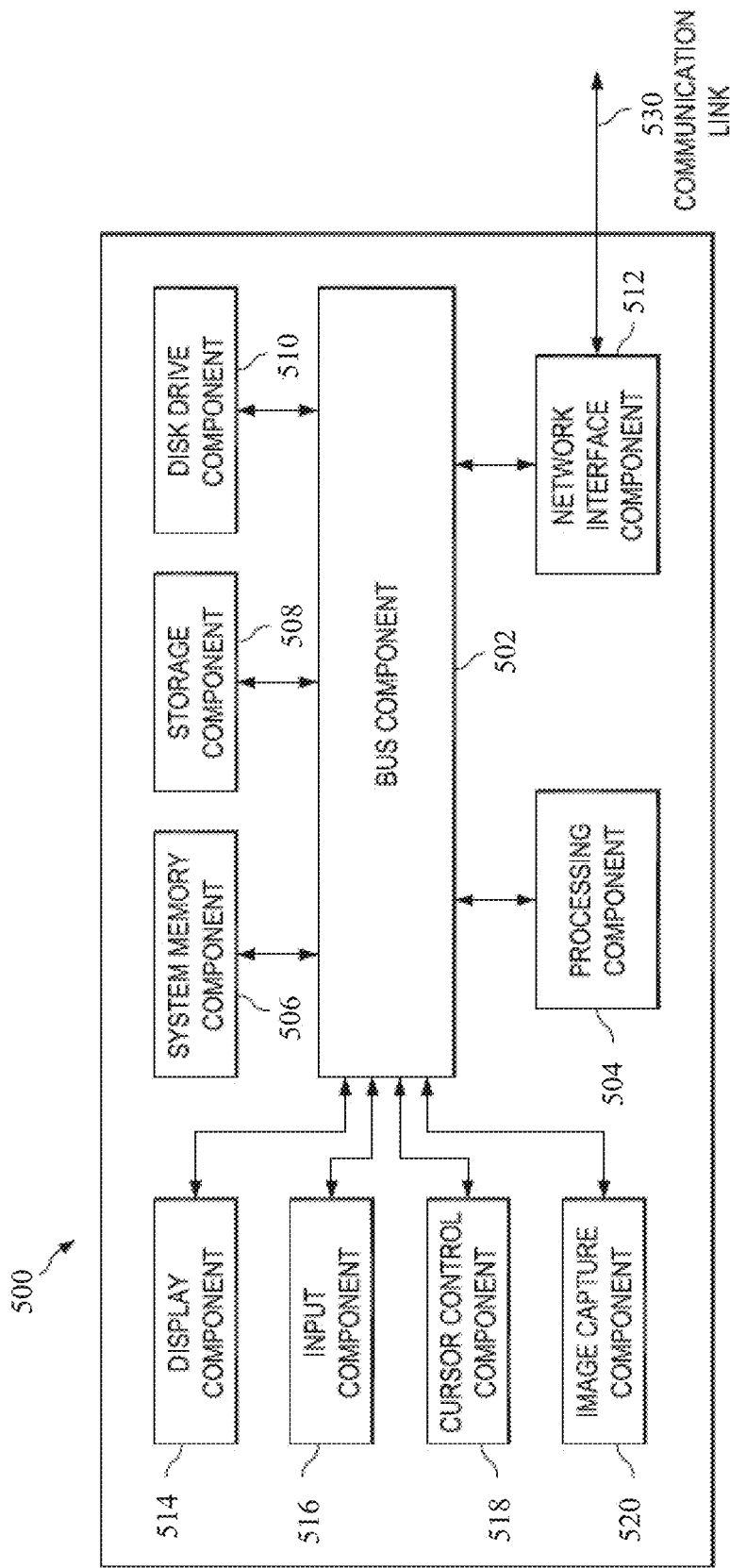
FIG. 5 is an example computer system according to various aspects of the present disclosure.

FIG. 5 is a block diagram of a computer system 500 suitable for implementing various methods and devices described herein, for example, the rule engine optimization module 200, the rule engine itself, the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the rule engine optimization module 200 and the various method steps of the method 700 discussed below (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the rule engine optimization module 200 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the rule engine optimization module 200 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the rule engine optimization module 200 and external devices, for example with the user device 110, with the merchant server 140, or with the payment provider server 170, depending on exactly where the rule engine optimization module 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the rule engine optimization module 200 may be implemented as such software code.

Figure 6:
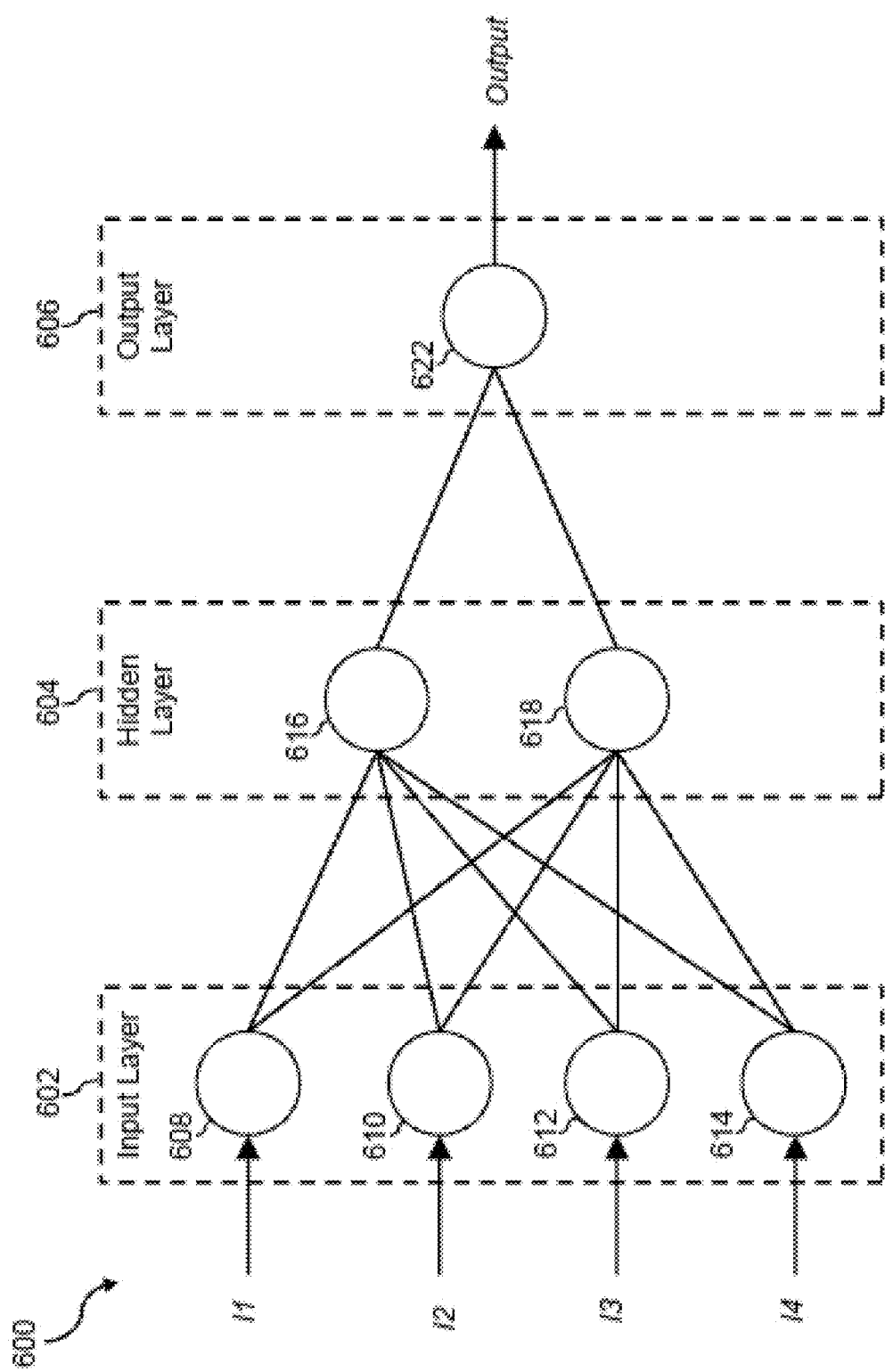
FIG. 6 illustrates an example artificial neural network according to various aspects of the present disclosure.

It is understood that machine learning may be used to refine the various aspects of the rule engine optimization module 200. The machine learning may be performed at least in part via an artificial neural network. In that regard, FIG. 6 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the rule engine optimization module 200, and the rule engine optimization module 200 may include as many hidden layers as necessary.

In this example, the artificial neural network 600 receives a set of input values and produces an output value. Each node in the input layer 602 may correspond to a distinct input value. For example, when the artificial neural network 600 is used to implement the rule engine optimization module 200, each node in the input layer 602 may correspond to a distinct attribute of a transaction.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the rule engine optimization module 200, the output value produced by the artificial neural network 600 may indicate a likelihood of an event (e.g., a dispute event, a chargeback event, etc.) associated with the transaction.

The artificial neural network 600 may be trained by using training data. By providing training data to the artificial neural network 600, the nodes 616-618 in the hidden layer 604 may be trained (adjusted) such that an optimal output (e.g., accurately parsing the computer programming code to identify common variables shared among multiple rules) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 7:
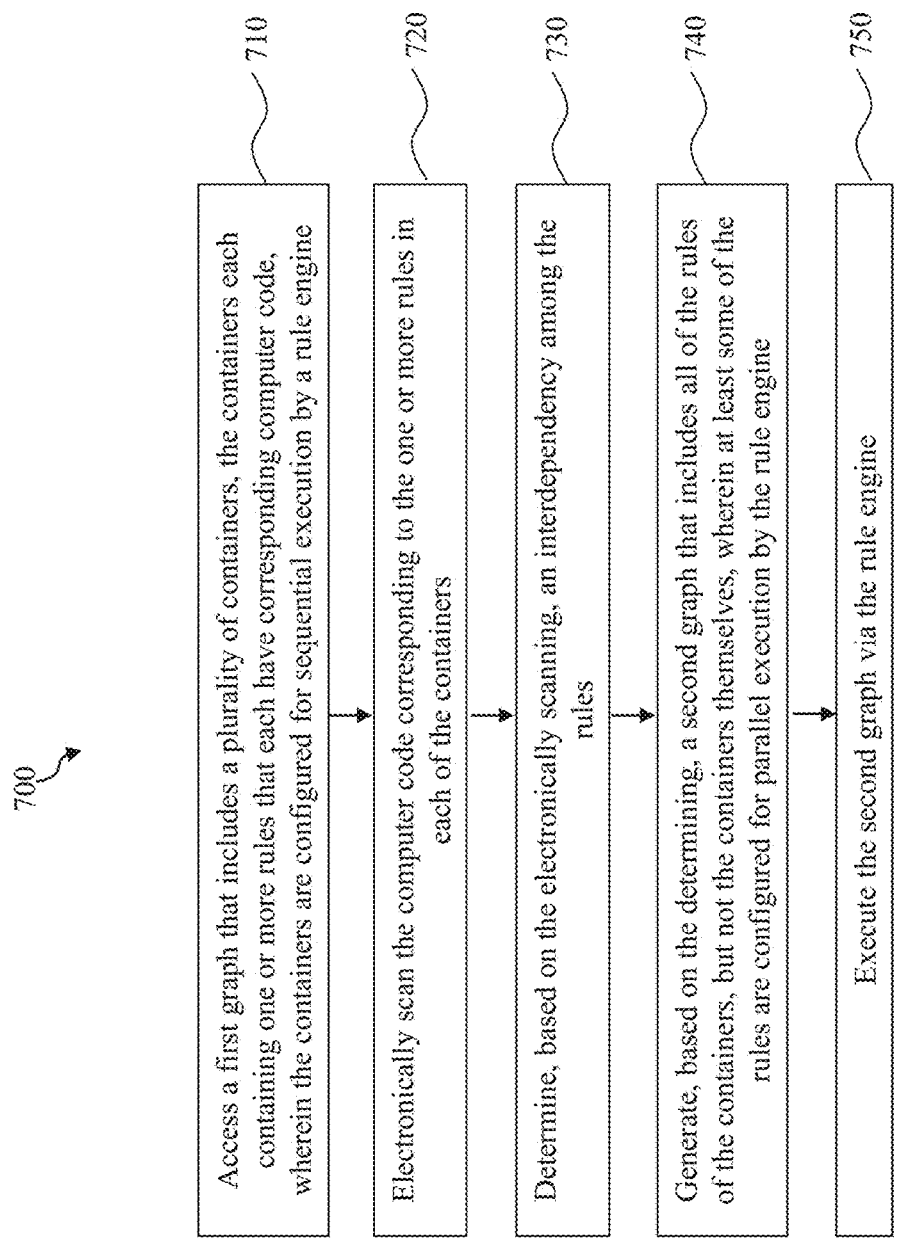
FIG. 7 is a flowchart illustrating a method of storing information into an electronic database according to various aspects of the present disclosure.

FIG. 7 is a flowchart illustrating a method 700 for optimizing the performance of a rule engine according to various aspects of the present disclosure. The various steps of the method 700 may be performed by one or more electronic processors. In some embodiments, at least some of the steps of the method 700 may be performed by the rule engine optimization module 200 discussed above. Further, for conciseness, not all details associated with the steps below are included, as such details are discussed above, and thus, the steps described below include suitable descriptions above.

The method 700 includes a step 710 to access a first graph that includes a plurality of containers. The containers each contain one or more rules that each have corresponding computer code. The containers are configured for sequential execution by a rule engine. In some embodiments, at least a subset of the rules are associated with fraud prevention or with user personalization.

The method 700 includes a step 720 to electronically scan the computer code corresponding to the one or more rules in each of the containers. In some embodiments, the electronic scan is based on an abstract syntax tree of a computer programming language with which the computer code corresponding to the rules are programmed. In some embodiments, the step 720 may include a step of parsing the computer code based on the abstract syntax tree, as well as a step of determining, based on the parsing, one or more common variables among multiple rules.

The method 700 includes a step 730 to determine, based on the electronically scanning, an interdependency among the rules.

The method 700 includes a step 740 to generate, based on the determining, a second graph that includes all of the rules of the containers, but not the containers themselves. At least some of the rules are configured for parallel execution by the rule engine. In some embodiments, the at least some of the rules that are configured for parallel execution do not depend on one another.

The method 700 includes a step 750 to execute the second graph via the rule engine.

In some embodiments, the executing the second graph is performed in response to receiving a request to process a transaction.

It is understood that additional method steps may be performed before, during, or after the steps 710-750 discussed above. For example, the method 700 may include a step to identify a first subset of the rules as Input/Output bound (I/O bound) rules, a step to identify a second subset of the rules as Central Processing Unit bound (CPU bound) rules, and a step to execute the I/O bound rules separately from the CPU bound rules. In some embodiments, the I/O bound rules, when executed, load data from sources outside the first graph via one or more electronic network components. In some embodiments, the CPU bound rules, when executed, do not load data from sources outside the first graph via the one or more electronic network components. In some embodiments, the executing the I/O bound rules separately from the CPU bound rules comprises: executing the I/O bound rules with a first pool of threads; and executing the CPU bound rules with a second pool of threads. In some embodiments, the at least some of the rules that are configured for parallel execution are the I/O bound rules. For reasons of simplicity, other additional steps are not discussed in detail herein.

Based on the above discussions, it can be seen that the present disclosure offers several advantages over conventional methods and systems. It is understood, however, that not all advantages are necessarily discussed in detail herein, different embodiments may offer different advantages, and that no particular advantage is required for all embodiments. One advantage is improved functionality of a computer. For example, by using the rule engine optimization module 200 to generate the new graph where the rules are executed in multiple threads in parallel, the computer(s) on which the rule engine is run does not waste time in loading the data for the runs. As such, the present disclosure effectively increases the speed in computer operations. The inventive ideas of the present disclosure are also integrated into a practical application, for example into the rule engine optimization module 200, such that it may be used to facilitate fraud prevention and/or providing customized services for a user for a real-world payment provider or another suitable platform through which transactions are conducted.

FIG. 8 illustrates an example cloud-based computing architecture 800, which may also be used to implement various aspects of the present disclosure. The cloud-based computing architecture 800 includes a mobile device 804 (e.g., the user device 110 of FIG. 1) and a computer 802 (e.g., the merchant server 140 or the payment provider server 170), both connected to a computer network 806 (e.g., the Internet or an intranet). In one example, a consumer has the mobile device 804 that is in communication with cloud-based resources 808, which may include one or more computers, such as server computers, with adequate memory resources to handle requests from a variety of users. A given embodiment may divide up the functionality between the mobile device 804 and the cloud-based resources 808 in any appropriate manner. For example, an app on mobile device 804 may perform basic input/output interactions with the user, but a majority of the processing may be performed by the cloud-based resources 808. However, other divisions of responsibility are also possible in various embodiments. In some embodiments, using this cloud architecture, the rule engine optimization module 200 may reside on the merchant server 140 or the payment provider server 170, but its functionalities can be accessed or utilized by the mobile device 804, or vice versa.

The cloud-based computing architecture 800 also includes the personal computer 802 in communication with the cloud-based resources 808. In one example, a participating merchant or consumer/user may access information from the cloud-based resources 808 by logging on to a merchant account or a user account at computer 802. The rule engine and/or the rule engine optimization module as discussed above may be implemented at least in part based on the cloud-based computing architecture 800.

It is understood that the various components of cloud-based computing architecture 800 are shown as examples only. For instance, a given user may access the cloud-based resources 808 by a number of devices, not all of the devices being mobile devices. Similarly, a merchant or another user may access the cloud-based resources 808 from any number of suitable mobile or non-mobile devices. Furthermore, the cloud-based resources 808 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method. The method includes: accessing a first graph that includes a plurality of containers, the containers each containing one or more rules that each have corresponding computer code, wherein the containers are configured for sequential execution by a rule engine; electronically scanning the computer code corresponding to the one or more rules in each of the containers; determining, based on the electronically scanning, an interdependency among the rules; and generating, based on the determining, a second graph that includes all of the rules of the containers, but not the containers themselves, wherein at least some of the rules are configured for parallel execution by the rule engine Another aspect of the present disclosure involves a system that includes a non-transitory memory and one or more hardware processors coupled to the non-transitory memory and configured to read instructions from the non-transitory memory to cause the system to perform operations comprising: performing an electronic scan of computer programming code corresponding to a first graph, the first graph including a plurality of folders that are configured for sequential execution by a rule engine, the folders each containing one or more rules; identifying, based on the electronic scan, a plurality of subsets of the rules, wherein the rules within each subset are dependent on one or more other rules in that subset but are independent of rules in other subsets; generating a second graph that includes a plurality of threads, wherein each of the threads corresponds to a respective one of the subsets of the rules; and executing, via the rule engine, the plurality of the threads in parallel.

Yet another aspect of the present disclosure involves a non-transitory machine-readable medium having stored thereon machine-readable instructions executable to cause a machine to perform operations comprising: accessing computer programming code of a plurality of rules of a first graph, the rules being located in a plurality of folders that are sequentially executable by a rule engine; identifying, based on the accessing and at least in part using an abstract syntax tree, common variables that appear in the computer programming code for multiple rules from a same folder or from different folders; determining, based on the identified common variables, an interdependency among all of the rules of the first graph; generating, based on the determining, a second graph that is free of the folders but includes the same rules of the first graph, wherein the rules are arranged into different subsets, and wherein the rules from each subset are independent from the rules from the other subsets; and executing, via the rule engine, the different subsets of the rules in parallel with one another.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   accessing a first graph that includes a plurality of containers, wherein each of the plurality of containers contains one or more rules comprising computer code of a computer programming language, and wherein the plurality of containers is configured to enable sequential execution by a rule engine;
   electronically scanning the computer code corresponding to the one or more rules in each of the plurality of containers, wherein the electronically scanning is performed at least in part by:
      parsing the computer code, the parsing including accessing a tree representation of an abstract syntactical structure of the computer programming language; and
      determining, based on the parsing, one or more common variables among multiple rules;
   determining, based on the electronically scanning, an interdependency among at least a subset of the rules in the plurality of containers;
   generating, based on the determining, a second graph that includes the subset of the rules of each of the plurality of containers, but not the containers themselves, wherein at least some of the rules are configured for parallel execution by the rule engine; and
   executing the second graph via the rule engine;
   wherein at least one of the accessing, the electronically scanning, the determining, the generating, or the executing is performed using one or more hardware processors.

2. The method of claim 1, wherein the executing the second graph is performed in response to receiving a request to process a transaction.

3. The method of claim 1, wherein the at least some of the rules that are configured to enable parallel execution do not depend on one another.

4. The method of claim 1, further comprising:
   identifying a first subset of the rules as Input/Output (I/O) bound rules;
   identifying a second subset of the rules as Central Processing Unit (CPU) bound rules; and
   executing the I/O bound rules separately from the CPU bound rules.

5. The method of claim 4, wherein:
   I/O bound rules, when executed, load data from sources outside the first graph via one or more electronic network components; and
   the CPU bound rules, when executed, do not load data from sources outside the first graph via the one or more electronic network components.

6. The method of claim 4, wherein the executing the I/O bound rules separately from the CPU bound rules comprises:
   executing the I/O bound rules with a first pool of threads; and
   executing the CPU bound rules with a second pool of threads.

7. The method of claim 4, wherein the at least some of the rules that are configured to enable parallel execution are the I/O bound rules.

8. The method of claim 1, wherein at least a subset of the rules are associated with fraud prevention or with user personalization.

9. The method of claim 1, wherein the parsing the computer code comprises identifying a first part of the computer code corresponding to a command, identifying a second part of the computer code corresponding to a condition statement, identifying a third part of the computer code corresponding to an operator, identifying a fourth part of the computer code corresponding to a variable, or identifying a fifth part of the computer code corresponding to a value to be assigned to the variable.

10. A system, comprising:
   a non-transitory memory; and
   or more hardware processors coupled to the non-transitory memory and configured to read instructions from the non-transitory memory to cause the system to perform operations comprising:
      accessing a first graph that includes a plurality of containers, wherein each of the plurality of containers contains one or more rules comprising computer code of a computer programming language, and wherein the plurality of containers is configured to enable sequential execution by a rule engine;
      electronically scanning the computer code corresponding to the one or more rules in each of the plurality of containers, wherein the electronically scanning is performed at least in part by:
         parsing the computer code, the parsing including accessing a tree representation of an abstract syntactical structure of the computer programming language; and
         determining, based on the parsing, one or more common variables among multiple rules;
      determining, based on the electronically scanning, an interdependency among the one or more rules in the plurality of containers;

generating, based on the determining, a second graph that includes the one or more rules of each of the plurality of containers, but not the containers themselves, wherein at least some of the rules are configured to enable parallel execution by the rule engine; and executing the one or more rules of the second graph via the rule engine.

11. The system of claim 10, wherein the at least some of the rules that are configured to enable parallel execution are independent of one another.

12. The system of claim 10, wherein the operations further comprise:

identifying a first subset of the rules as Input/Output (I/O) bound rules;

identifying a second subset of the rules as Central Processing Unit (CPU) bound rules; and executing the I/O bound rules separately from the CPU bound rules at least in part by executing the I/O bound rules with a first pool of threads and executing the CPU bound rules with a second pool of threads.

13. The system of claim 12, wherein:

at least some of the rules that are configured to enable parallel execution are the I/O bound rules;

I/O bound rules, when executed, load data from sources outside the first graph via one or more electronic network components; and the CPU bound rules, when executed, do not load data from sources outside the first graph via the one or more electronic network components.

14. A non-transitory machine-readable medium having stored thereon machine-readable instructions executable to cause a machine to perform operations comprising:

accessing a first graph that includes a plurality of containers, wherein each of the plurality of containers contains one or more rules comprising computer code of a computer programming language, and wherein the plurality of containers is configured to enable sequential execution by a rule engine;

electronically scanning the computer code corresponding to the one or more rules in each of the plurality of containers, wherein the electronically scanning is performed at least in part by:

parsing the computer code, the parsing including accessing a tree representation of an abstract syntactical structure of the computer programming language; and determining, based on the parsing, one or more common variables among multiple rules;

determining, based on the electronically scanning, an interdependency among the one or more rules in the plurality of containers; and based on the determining, a second graph that includes the one or more rules of each of the plurality of containers, but not the containers themselves, wherein at least some of the rules are configured to enable parallel execution by the rule engine, wherein the one or more rules of the second graph are executed by the rule engine.

15. The non-transitory machine-readable medium of claim 14, wherein the operations further comprise:

identifying a first subset of the rules as Input/Output (I/O) bound rules;

identifying a second subset of the rules as Central Processing Unit (CPU) bound rules; and executing the I/O bound rules separately from the CPU bound rules at least in part by executing the I/O bound rules with a first pool of threads and executing the CPU bound rules with a second pool of threads;

wherein:

at least some of the rules that are configured to enable parallel execution are the I/O bound rules;

the I/O bound rules, when executed, load data from sources outside the first graph via one or more electronic network components; and the CPU bound rules, when executed, do not load data from sources outside the first graph via the one or more electronic network components.

16. The non-transitory machine-readable medium of claim 14, wherein the parsing the computer code comprises identifying a first part of the computer code corresponding to a command, identifying a second part of the computer code corresponding to a condition statement, identifying a third part of the computer code corresponding to an operator, identifying a fourth part of the computer code corresponding to a variable, or identifying a fifth part of the computer code corresponding to a value to be assigned to the variable.

17. The non-transitory machine-readable medium of claim 14, wherein the one or more rules of the second graph are executed by the rule engine in response to receiving a request to process a transaction.

18. The non-transitory machine-readable medium of claim 14, wherein at least some of the rules that are configured to enable parallel execution do not depend on one another.

19. The non-transitory machine-readable medium of claim 14, wherein at least a subset of the one or more rules are associated with fraud prevention.

20. The non-transitory machine-readable medium of claim 14, wherein at least a subset of the one or more rules are associated with user personalization.

* * * * *